Nov. 5, 1968 J. TSCHUDY, JR 3,409,177
CARTRIDGE LOADED HOPPER APPARATUS
Filed Jan. 3, 1966
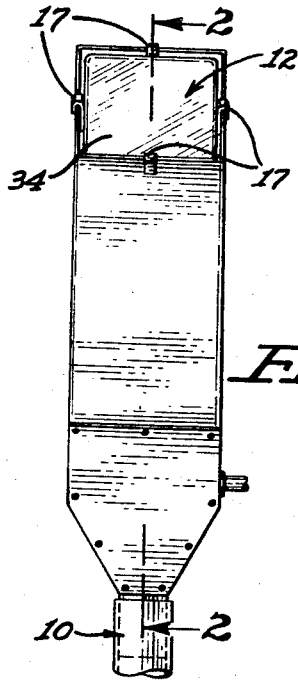
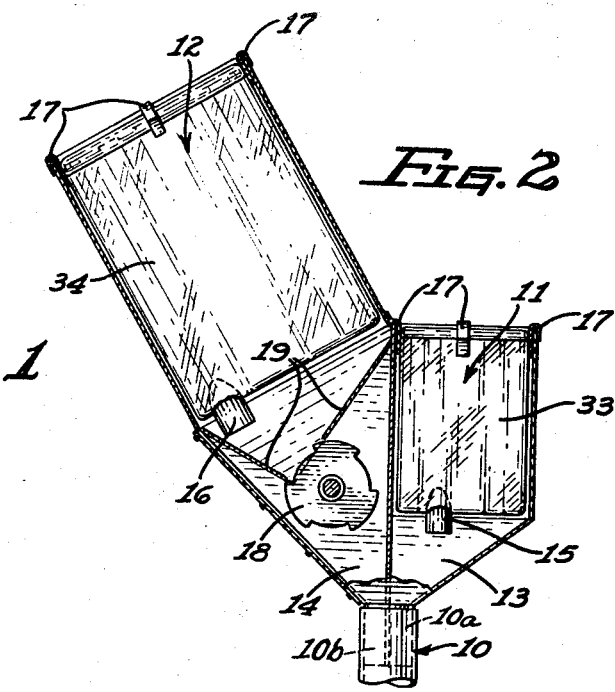
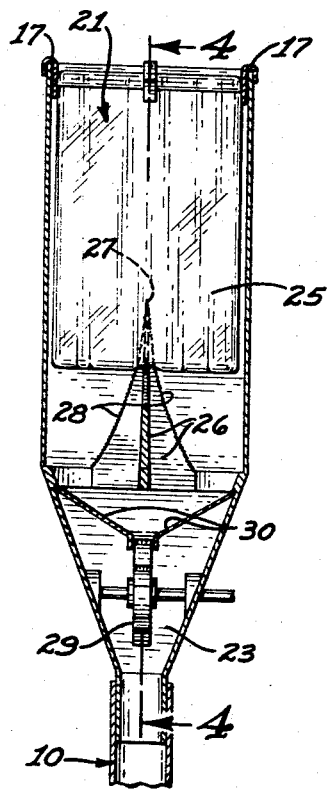
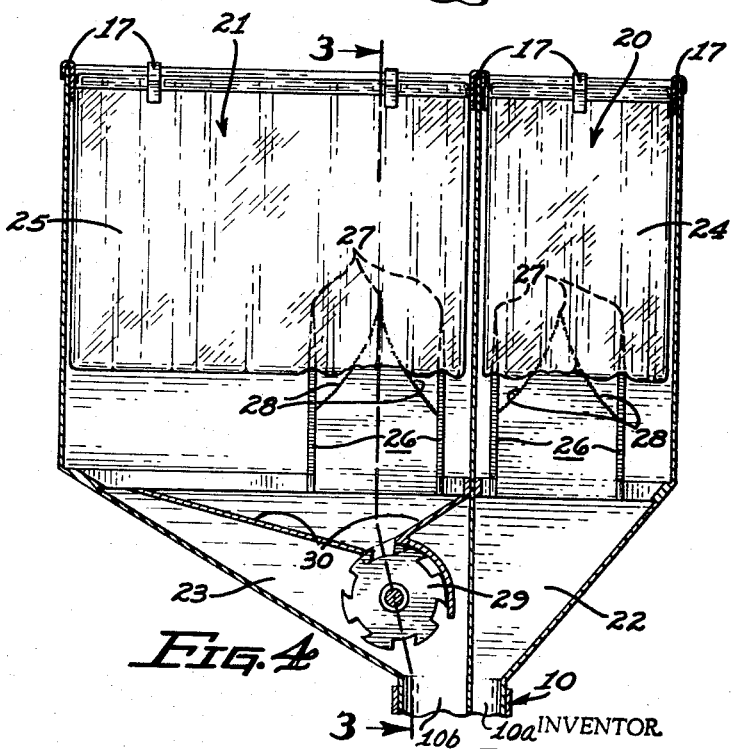
INVENTOR.
JAY TSCHUDY, JR.
BY
Willard S. Grow
ATTORNEY.

United States Patent Office 3,409,177
Patented Nov. 5, 1968

3,409,177
CARTRIDGE LOADED HOPPER APPARATUS
Jay Tschudy, Jr., Shawnee Mission, Kans., assignor to Precision Agricultural Machinery Company, Phoenix, Ariz., a corporation of Arizona
Filed Jan. 3, 1966, Ser. No. 518,264
3 Claims. (Cl. 222—82)

ABSTRACT OF THE DISCLOSURE

A cartridge loaded hopper and dispensing apparatus in which the bagged or sacked material is placed in a guide and support hopper, perforated automatically therein, and dispensed by the device through a discharge chute.

---

This invention pertains to improvements in a cartridge loaded hopper system and apparatus and is particularly directed to an arrangement for distributing packaged seed, fertilizer, vermiculite and the like to a seed planting device.

One of the objects of this invitation is to provide a system of packaging and dispensing seed, fertilizer and related materials to a seed planter for planting a crop in a field.

Still another object of this invention is to provide an accessory equipment to be used in conjunction with an automatic precision seed planter such, for example, as shown in Patent 3,154,031.

Still another object of this invention is to provide a system whereby the seed, chemically treated vermiculite, mulch and any other solid components to be fed through a seed planter be previously packaged in plastic bags or the like.

It is still another object of this invention to provide an arrangement wherein bags containing the aforementioned ingredients themselves would be fed into proper receptacles mounted on the seed planter to automatically distribute the material to the planting elements of the machine.

It is a further object of this invention to provide a specially constructed receptacle in connection with a seed planting apparatus having a sharp cutting device to puncture holes in the containers of the material to be distributed to the planter and to thereby automatically feed the material thereto.

Still another object of this invention is to provide packages for the treated vermiculite and similar materials so as to make it easier to handle the same and eliminate thereby a considerable amount of tedious hand labor.

A still further object of this invention is to provide a packaging system wherein the vermiculite will be contained in sealed relationship at all times to the planting machinery so as to eliminate any danger of the treated vermiculite being blown into the eyes of the operator or otherwise dissipated in the wind during the actual seeding operations and thereby prevent a health hazard from the toxic effects of the treated vermiculite or other fertilizing materials.

Further features and advantages of this invention will appear from a detailed description of the drawings in which:

FIG. 1 is a rear elevation of an example of one form of cartridge loaded hopper unit.

FIG. 2 is a sectional view on the line 2—2 of FIG. 1.

FIG. 3 is a rear sectional view on the line 3—3 of FIG. 4.

FIG. 4 is a side sectional view on the line 4—4 of FIG. 3.

As an example of one embodiment of this invention, there is shown in FIGS. 1 and 2 one embodiment of a cartridge loaded hopper apparatus arranged to be mounted directly on the supply pipe 10 having the discharge passageways 10a and 10b of a precision planter or the like such as shown in Patent 3,154,031. The arrangement comprises a plurality of cartridge or bag hoppers, such as the seed bag hopper 11 and the vermiculite bag hopper 12, each of which accomodates a plastic or similar bag containing the materials to be distributed and planted.

Each bag hopper or receptacle 11 and 12 will feed to the respective discharge passageways 10a and 10b supply pipe 10 through suitable chutes 13 and 14 and each contains a sharpened cylindrical bag opening and discharge tube 15 and 16 which will pierce the plastic bags 33 and 34 so as to enable the treated vermiculite or seed to feed by gravity into the planter supply pipe 10, the bags being appropriately held by suitable bag hooks 17 while their contents are being discharged. If required, a suitable vermiculite meter wheel 18 cooperating with the baffles 19 may be utilized for the controlled discharge of the material to the discharge pipe 10 of the planter.

In the modification shown in FIGS. 3 and 4, a pair of bag hoppers or receptacles 20 and 21 are mounted on the supply pipe 10 for a planter such as in Patent 3,154,031 and connected to the respective passageways 10a and 10b by means of suitable chutes 22 and 23. The bags 24 and 25 containing the materials to be distributed and planted are merely fed into the respective hoppers 20 and 21 in the bottom of which is provided puncturing devices 26 having sharp tips 27 and radially outwardly and downwardly extending serrated cutting edges 28 to perforate the bags as they are placed in the bag hoppers, the contents of the bags feeding through the openings made by the puncturing devices 26 by gravity into the chutes 22 and 23 into the supply pipe 10 to the planter.

If required of the material a metering wheel 29 cooperating with the baffles 30 may be utilized between the bag hopper 21 and the discharge chute 23 to control the discharge of material such as vermiculite to the planter. Thus, seed, chemically treated vermiculite, mulch and any other solid components to be fed through the planter may be packaged in suitable bags and fed while so packaged directly to the planter mechanism without spilling, drying out, or blowing about by the wind to thereby greatly facilitate the handling of the material and with the substantial complete elimination of air pollution and contamination of the operator of the planter apparatus.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A cartridge loaded hopper apparatus comprising in combination:
    (a) a frame including a main discharge supply pipe,
    (b) a plurality of cartridge guiding and supporting hoppers on the frame arranged to accommodate a bag-like container for the materials to be distributed to a planter and the like,
    (c) a plurality of discharge passageways within said supply pipe, one for each of the cartridge guiding and supporting hoppers,
    (d) a chute interconnected between each of the hoppers and a corresponding discharge passageway having converging material guiding surfaces terminating at the passageways, (e) and a sharp pointed cartridge bag perforating and discharge tube located within the chutes for piercing the bag to automatically discharge by gravity the contents thereof into the main discharge supply pipe.

2. A cartridge loaded hopper apparatus as in claim 1 wherein a meter wheel is mounted within the chute between the perforating tube and the discharge passageway for at least one of said hoppers.

3. A cartridge loaded hopper apparatus as in claim 1 wherein a meter wheel is mounted within the chute between the perforating tube and the discharge passageway for at least one of the hoppers and including baffles between the hopper and the meter wheel to conduct material from the perforating tube to the meter wheel.

References Cited

UNITED STATES PATENTS

| | | | |
|---|---|---|---|
| 2,007,449 | 7/1935 | Kernodle et al. | 222—90 |
| 2,023,397 | 12/1935 | Blomgren | 222—90 |
| 2,197,958 | 4/1940 | Waters | 222—105 X |
| 2,203,710 | 6/1940 | Young | 222—145 X |
| 2,258,636 | 10/1941 | Young et al. | 222—145 X |
| 2,350,836 | 6/1944 | Christmas | 141—330 X |
| 2,684,788 | 7/1954 | Bland | 222—328 X |
| 3,193,145 | 7/1965 | Vara | 222—82 |
| 3,206,074 | 9/1965 | Hoffmann | 222—94 |
| 3,276,629 | 10/1966 | Blysma et al. | 222—328 X |

STANLEY H. TOLLBERG, *Primary Examiner.*